April 18, 1967     J. R. BIARD     3,315,176
ISOLATED DIFFERENTIAL AMPLIFIER
Filed Nov. 29, 1963     2 Sheets-Sheet 1

INVENTOR.
JAMES R. BIARD
BY
ATTORNEY

United States Patent Office 3,315,176
Patented Apr. 18, 1967

3,315,176
ISOLATED DIFFERENTIAL AMPLIFIER
James R. Biard, Richardson, Tex., assignor to Texas Instruments Incorporated, Dallas, Tex., a corporation of Delaware
Filed Nov. 29, 1963, Ser. No. 327,133
9 Claims. (Cl. 330—59)

The present invention relates generally to a transistor differential amplifier. More particularly, it relates to a transistor differential amplifier which has an infinite common mode signal rejection.

Measurement of physical quantities are often made with various transducers that produce electrical outputs which are proportional to the quantity measured. Common physical quantities measured are pressure and temperature, as examples. The electrical output usually takes the form of a voltage difference, or the difference in the level of two electrical signals, and this difference is normally amplified for purposes of indicating or recording the same. The difference signal or voltage is fed to the input of a differential amplifier along a pair of lines, wires or cables, whereby the signal difference between the two lines is the electrical quantity amplified.

In the event that a large common mode signal is impressed on the two lines carrying the differential signal to the amplifier input, the amplifier will normally be unable to reject the common mode signal and distinguish it from the differential signal. For purposes of this application, a common mode signal is the same signal, A.C. or D.C., impressed on each of the two lines. Thus, for example, a D.C. voltage can be impressed on each of the two lines if the D.C. voltage is inherent in the transducer or other means used to generate the differential signal. Similarly, an A.C. common mode signal can be induced in the two lines if an A.C. signal source is present and there is sufficient coupling between the source and the lines. If the differential amplifier to which the difference signal is applied for amplification is grounded or connected electrically to a reference potential, and one of the input lines is referred to the reference potential, the amplifier will normally be unable to distinguish between the difference signal and the common mode signal.

To solve this problem, the amplifier must be completely electrically isolated from any reference potential and be free of physical electrical connections to the other circuits which would tend to establish a reference potential, except the input connections carrying the difference signal. In this manner, a common mode signal on the two input lines will not be amplified, since neither of the two lines are held at a reference potential but can vary according to the signal carried thereby. Such an amplifier would have an infinite common mode rejection and would detect and pass only the difference signal. Actual attempts to solve this problem have occasioned the use of transformer coupling to provide electrical isolation. Several disadvantages are encountered in transformer coupling, however, in that complete electrical isolation is not achieved because of magnetic pickup and winding capacitance. Moreover, isolation transformers are expensive and bulky, and to pass a D.C. signal through a transformer isolation stage, a chopper must be employed to convert the D.C. to an A.C. signal.

The present invention provides a differential amplifier having an infinite common mode rejection in that the amplifier is completely electrically isolated from any reference potential except the input at which the voltage is determined by the common mode signal and the differential signal. This is accomplished by means of an amplifier in which the power supply and the output terminals, across which a signal is generated in response to the difference signal at the input terminals, are electrically isolated therefrom. The output of the amplifier can, therefore, be connected to any following stage without "Trying" the amplifier to a reference potnetial. Similarly, although the power supply may be referenced to ground, the amplifier is in no way electrically related thereto. The electrical isolation is achieved by means of electro-optical coupling devices in which solid-state, semiconductor light sources are optically coupled to semiconductor, photosensitive devices, which devices conduct in response to the optical radiation, and in which A.C. or D.C. signals are passed by the optical radiation. Because of the means used to provide the electrical isolation, the amplifier is readily adapted to miniature circuit applications.

Other objects, features and advantages of the present invention will become apparent from the detailed description of a preferred embodiment thereof when taken in conjunction with the appended claims and the attached drawing wherein like reference numerals refer to like parts throughout the several figures, and in which:

FIGURE 1 is an electrical schematic diagram of a preferred embodiment of the differential amplifier of the invention utilizing electro-optical coupling devices to achieve electrical isolation;

FIGURE 2 is graphical illustrations showing the relative coefficient of absorption of optical radiation as a function of wavelength for the semiconductor materials silicon and germanium as compared to the relative intensity of optical radiation as a function of wavelength for three different solid-state, semiconductor light sources comprised of gallium-arsenide-phosphide ($GaAs_{0.6}P_{0.4}$), gallium-arsenide (GaAs), and indium-gallium-arsenide ($In_{.05}Ga_{.95}As$), respectively;

Figure 1:
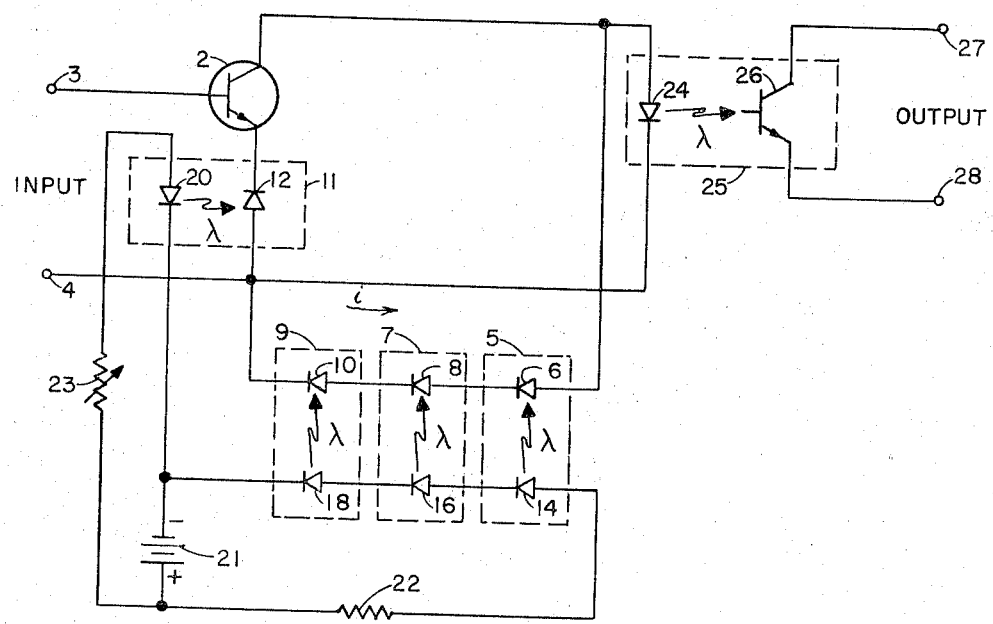

Referring now to FIGURE 1, an n-p-n transistor 2 is used as an amplifier for a difference signal applied to input terminals 3 and 4. Terminal 3 is connected to the base of transistor 2 and terminal 4 is connected to the emitter throguh a diode 12 to be described below. Connected in parallel with the series connection of transistor 2 and diode 12 are a plurality of serially connected photosensitive, semiconductor diodes. In the embodiment of FIGURE 1, three such diodes 6, 8 and 10 are connected in series with the anode of diode 6 connected to the collector of the transistor, and the cathode of diode 10 connected to the anode of diode 12. Also connected in parallel with the transistor and the serially connected photosensitive diodes is another semiconductor junction diode 24, with polarity the same as the diodes 6, 8 and 10. As will be presently described, the diodes 6, 8 and 10 act as a power supply for the amplifier stage, and diode 24 constitutes the amplifier output load.

Optically coupled to the diodes 6, 8 and 10 are solid-state, semiconductor junction diode light sources 14, 16 and 18, respectively. A similar light source 20 is optically to diode 12. Each of the light sources, to be described below in detail, which are semiconductor active junction devices, emits optical radiation of a characteristic wavelength when a forward current is caused to flow through the junction thereo. A D.C. voltage source 21 is connected across light sources 14, 16 and 18 through the constant limiting resistor 22 to supply to forward current flow with polarity as shown. The voltage source is also connected across light source 20 through variable resistor 23. The load diode 24 is another light source, such as diodes 14, 16 and 18, and is optically coupled to a photosensitive transistor 26 which conducts in response to the optical radiation generated by the diode 24. For purposes of this application, the terms light and optical radiation are used interchangeably and are defined as electromagnetic radiation in the wavelength region from the near infrared into the visible spectrum.

Because of the forward current flow supplied by voltage source 21 through the diode light sources 14, 16 and 18, optical radiation is emitted by these light sources and is absorbed by the photosensitive diodes 6, 8 and 10, respectively. The diodes 6, 8 and 10, because of their semiconductor properties, are photosensitive, and light absorbed thereby creates a photocurrent proportional to the light intensity. Thus, in effect, a constant current source is provided as a power supply for the amplifier circuit wherein the conventional external current flow is from anode to cathode as shown by the notation $i$. The constant current supplied by the diodes 6, 8 and 10 is shared by the transistor 2 and load diode 24. When the transistor 2 is completely cut-off or non-conducting, all of the constant supply current flows through the load diode 24. As the transistor 2 conducts, some of the constant supply current flows through this path, and it can be seen that the amount of current flowing through the load diode 24 is the difference between the total constant supply current and the current passing through transistor 2. This, in turn, is controlled by the amount of bias current to the input terminals 3 and 4. As noted earlier, the load diode 24 is a solid-state, semiconductor junction light source just as are diodes 14, 16 and 18, wherein the intensity of the optical radiation emitted thereby is directly proportional to the forward current flow through the junction. Thus, as input terminal 3 becomes more positive with respect to input terminal 4 to cause the n-p-n transistor 2 to conduct more, assuming such a signal exists at the input terminals, the current flowing through the load diode light source 24 decreases accordingly. The photosensitive transistor 26 absorbs the light generated by the diode 24 and conducts proportional to the intensity thereof to provide a signal at the output terminals 27 and 28 connected to the collector and emitter, respectively, of transistor 26. The output terminals can be connected to any desired circuit without establishing an electrical connection to the isolated amplifier stage.

To provide versatility in the amplification of differential signals to the input terminals 3 and 4, the photosensitive diode 12 is connected between the emitter of transistor 2 and the input terminal 4 with polarity as shown. Optically coupled to the diode 12 is another diode light source 20 as previously described, and is connected across the voltage supply 21 through a variable resistor 23. The amount of current flowing through the diode light source 20 is adjusted by means of the variable resistor 23 until the photosensitive diode 12 becomes conductive and creates sufficient voltage to forward bias the emitter-base junction of transistor 2. In fact, the variable resistor 23 is adjusted until the transistor is conducting in its linear operating region so that the constant supply current from diodes 6, 8 and 10 is about equally shared by the light emitting diode 24 and transistor 2 when there is no input signal present at input terminals 3 and 4. Then, regardless of the variation in voltage at input terminal 3 with respect to terminal 4, whether negative or positive, the transistor will be caused to conduct more or less, and a corresponding signal will appear at output terminals 27 and 28. It is to be understood that diode 12 can be eliminated and replaced by a direct connection between the emitter of transistor 2 and input terminal 4. In such a case, however, only differential signals in which the voltage at terminal 3 is positive with respect to terminal 4 by an amount sufficient to forward bias the base-emitter junction of the transistor 2 will be amplified and passed to the output terminals. The circuit, as shown in FIGURE 1, however, amplifies both positive and negative (increasing and decreasing) differential signals.

The output of the amplifier and the power supplied thereto are completely electrically isolated from the amplifier by means of optical radiation, and as a consequence, the amplifier has perfect common mode signal rejection. Only the single transistor 2 has been shown as comprising the entire active amplifier (in conjunction with the power supply and load) for purposes of illustration. Actually, a much more complex amplifier including many more active elements or transistors can be incorporated within the isolated stage shown in FIGURE 1. Moreover, the isolated amplifier need not necessarily have an amplification greater than unity; it can be less than unity. Broadly, the isolated amplifier acts as an isolater to block out the common mode signal in addition to its amplification function. To add more stages of amplification, it is necessary to determine the number of photosensitive diodes necessary to provide the power supply. The number of diodes necessary is determined by the forward voltage drop across the diode when conducting. For all values of current to be expected through the load diode 24, the total voltage of the power supply must be sufficient to forward bias the load diode to conduction. As will be seen below, the preferred semiconductor material comprising the photosensitive diodes 6, 8 and 10 is silicon, although other materials are satisfactory. The preferred semiconductor material from which the light emitting diodes, including diode 24, are comprised is a III–V compound, such as GaAs or $GaAs_{0.6}P_{0.4}$, for examples. The forward voltage drop across a silicon diode is about .6–.7 volt, whereas the forward voltage drop for GaAs is about 1.2–1.4 volts. To insure that a sufficient supply voltage is available, three photosensitive diodes 6, 8 and 10 are shown in FIGURE 1. This is for purposes of illustration only, and the above criterion that the power supply voltage be sufficient to forward bias the load diode to conduct governs the actual number of power supply diodes needed.

An electro-optical coupling device used in the circuit of FIGURE 1 comprises a solid-state, semiconductor diode, which generates optical radiation of a characteristic wavelength when a forward current is passed through the junction thereof, optically coupled to a photosensitive, semiconductor active device (junction device), such as diodes 6, 8, 10 and 12 and transistor 26. Thus there are three electro-optical coupling devices 5, 7 and 9 shown within the dashed enclosures of FIGURE 1 to isolate the power supply, another ocupling device 11 to isolate the transistor biasing source, and a coupling device 25 to isolate the output of the amplifier. The latter uses a photosensitive transistor detector, whereas, the others are diode detectors, by preference. As will be explained more fully below, each of the coupling devices is characteried by a particular efficiency and over-all current gain. Current gain is defined to be the ratio of the output current of the coupling device to the input current. Because of the transistor action in the output coupling device 25, an over-all current gain of unity can be easily achieved. By making the gain unity at the output, the gain of the entire amplifier is equal to the gain of the amplifier transistor 2. The electro-optical devices shown within the dashed enclosures of FIGURE 1 are applications of the device described in the co-pending application of Biard et al., entitled Electro-Optical Coupling Device, Ser. No. 327,136, filed Nov. 29, 1963, now Patent No. 3,133,987, filed concurrently herewith and assigned to the common assignee. A description of such a coupling device, which uses a photosensitive transistor in the preferred embodiment thereof, will be given in the following paragraphs. However, it should be understood that the description also applies to the coupling devices 5, 7, 9 and 11 which use photosensitive diode detectors by taking into account the different number of junctions in the detectors.

A light emitting junction diode comprised of GaAs, is described in the copending application of Biard et al., entitled, Semiconductor Device, Ser. No. 215,642, filed Aug. 8, 1962, assigned to the same assignee, and is an example of a suitable solid-state light source such as diodes 14 or 20 of FIGURE 1. As will be described hereinafter in more detail, the diodes can be comprised of other semiconductor materials to produce optical radiation of different wavelengths. As described in the above co-pending application, the diode comprises a body of semiconductor material, which contains a p-n rectifying junction. A forward current bias, when caused to flow through the junction, causes the migration of holes and electrons across the junction, and recombination of electron-hole pairs results in the generation of optical radiation having a characteristic wavelength or photon energy equal to the band gap energy of the particular semiconductor material from which the diode is fabricated. It will be noted from the above co-pending application that the generation of optical radiation in the diode is caused by a forward current bias at the junction and is an efficient solid-state light source as contrasted to light generated by other mechanisms, such as reverse biasing the junction, avalanche processes, etc. The relative intensity of radiation as a function of wavelength for optical radiation generated by a gallium-arsenide p-n junction diode is shown in the lower graph of FIGURE 2, where it can be seen that the radiation intensity is greatest at a wavelength of .9 micron. A typical curve of the relative coefficient of absorption of light as a function of wavelength for silicon and germanium are shown in the upper graph of FIGURE 2, where it can be seen that the .9 micron wavelength radiation generated by a galliumarsenide diode will be absorbed by a body comprised either of silicon or germanium. Similar curves are shown for light generated by diodes comprised of galliumarsenidephosphide,

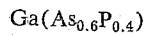

Figure 3:
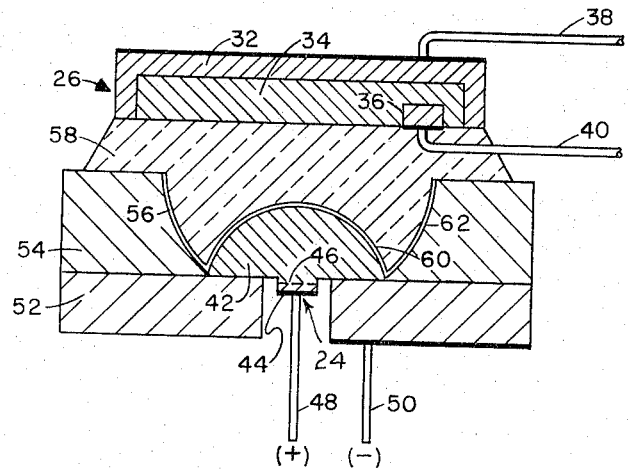
FIGURE 3 is an elevational view in section of one embodiment of the electro-optical coupling device used at the output of the amplifier of FIGURE 1.

$Ga(As_{0.6}P_{0.4})$ and indium-gallium-arsenide $(In_{.05}Ga_{.95}As)$, where it can be seen again that either a germanium or silicon body will absorb the light of wavelengths of .69 micron and 0.95 micron, respectively. These compositions are enumerated as examples only, and other useful compositions will be described below. It will also be noted from the graphs of absorption coefficients that before any appreciable absorption occurs in silicon or germanium, the photon energy must be at least slightly greater than the band gap energies of silicon and germanium, respectively. The band gap energies for silicon and germanium are 1.04 e.v. and .63 e.v., respectively. The graphs of FIGURE 3 show that absorption begins in silicon at a wavelength of about 1.15 micron, which corresponds to a photon energy of about 1.07 e.v., and increases with shorter wavelengths; and absorption begins in germanium at about 1.96 micron, which corresponds to a photon energy of about .64 e.v., and increases with shorter wavelengths. These two energies are greater than the respective band gap energies of the two materials, which clearly indicates the band-to-band transitions of electrons upon absorption, which is the type absorption with which the invention is concerned.

Since the optical radiation generated by the diodes 14, 16, 18, 20 and 24 must be absorbed by the photosensitive diodes 6, 8, 10 and 12 and photosensitive transistor 26, respectively, in such a manner to cause them to conduct, it is important to consider in more detail the absorption phenomenon which will more clearly illustrate the invention and its advantages. It can be seen from FIGURE 2 that the coefficient of absorption of light is less for longer wavelengths and, therefore, penetrates to a greater depth in a body of semiconductor material before being absorbed than does light of shorter wavelengths. When the light from diode 24 is absorbed in the transistor 26, for example, it generates charge carriers, the carriers, which are holes and electrons, must diffuse to the junction regions therewithin in order to produce a bias to cause the transistor to conduct. In other words, the invention is not concerned with the photoconductive effect within the material of the detector, but a junction effect, wherein the characteristics of the junction are altered when current carriers created by absorption of photons are collected at the junction. Therefore, the light must be absorbed in the transistor within the diffusion length of the carriers produced thereby from one or both of the junctions. The same is true for the photosensitive diodes 6, 8 and 10 with respect to the light from diodes 14, 16 and 18 bebing absorbed within the diffusion length of the carriers produced thereby from the diode junction. For longer wavelength light, the junction at which the carriers are collected must be at a relatively large depth below the surface of the transistor or diode body in order that the majority of carriers produced by the light be collected. In other words, more depth of material is required before all of the light impinging on the surface of the transistor or diode body is absorbed, although a percentage of the light will be absorbed in each successive unit thickness of the body. Thus the region over which the light is absorbed is relatively wide, and in order to insure the efficient collection at the junction of the majority of charge carriers generated thereby, relatively high lifetime material is used in the transistor or diode bulk when long wavelength light is used. However, high liftetime material increases the diffusion time of the charge carriers from their point of origination to the junction, therefore decreasing the speed at which the transistor or diode is turned on by the light. Conversely, by using optical radiation of shorter wavelengths, the junction depth and lifetime of the semiconductor material can be correspondingly decreased without decreasing the collection efficiency, such as by the use of a light emitting diode comprised of $GaAs_{0.6}P_{0.4}$, for example.

Figure 4:
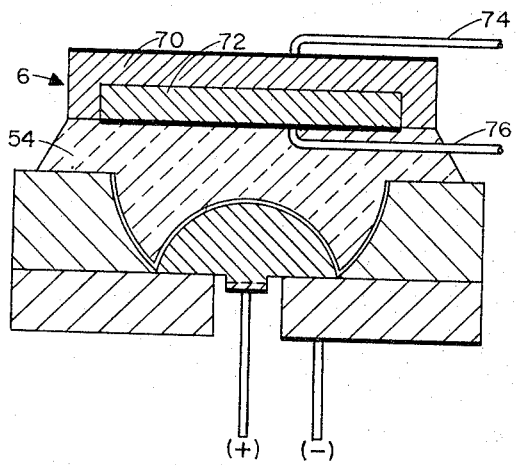
FIGURE 4 is an elevational view in section of only the photosensitive detector portion of one of the electro-optical coupling devices used to supply D.C. power to the amplifier of FIGURE 1.

A side elevational view in section of one embodiment of the electro-optical coupling device 25 of FIGURE 1 is shown in FIGURE 3, which comprises the transistor 26 and the semiconductor junction diode 24 optically coupled thereto. A side elevational view in section of only the photosensitive diode detector of the electro-optical coupling device 11 of FIGURE 1 is shown in FIGURE 4, diode 6 being identical to the diode 12. With reference to FIG. 3, the transistor 26 is comprised of semiconductor material such as germanium or silicon, and is of either the n-p-n or p-n-p variety. The transistor 26 has been shown in FIGURE 1 to be of the n-p-n variety, although a p-n-p variety could be used with a reversal of polarities in the circuit. There is also shown in FIGURE 3 a suitable structure for mounting the components of the electro-optical coupling device to provide the necessary optical coupling between the photosensitive detector and the driving source. The light emitting junction diode comprises a hemispherical semiconductor region 42 of a first conductivity type and a smaller region 44 of an opposite conductivity type contiguous therewith. An electrical connection 48 is made to the region 44 and constitutes the anode of the junction diode, and the flat side of the region 42 is mounted in electrical connection with a metallic plate 52 with the region 44 and lead 48 extending into and through a hole in the plate. An electrical lead 50 is provided to the metallic plate 52 and constitutes the cathode of the diode. The diode is fabricated by any suitable process, such as, for example, by the diffusion process described in the above co-pending application or by an epitaxial process to be described hereinafter, and contains a p-n rectifying junction 46 at or near the boundary between the regions 42 and 44.

The photosensitive transistor 26 comprises a semiconductor wafer 32 of a first conductivity type used as the collector into which an impurity of the opposite conductivity determining type is diffused to form a circular base region 34. An impurity of the same conductivity determining type as the original wafer 32 is diffused into the base region 34 to form an emitter region 36 of relatively small area. The transistor shown is of planar construction and is designed to have a relatively high forward current gain $h_{FE}$, with which those skilled in the art are familiar. An electrical connection is made to the collector region 32 by means of a wire 38, and another electrical connection is made to the emitter region 36 by means of wire 40. The base region 34 is left "floating" without an external electrical connection thereto, since the driving source for causing the transistor to conduct is effected by means of the optical radiation from the junction diode.

Another plate 54 is mounted about the diode and defines a hemispherical reflector surface 56 about the hemispherical dome 42. The photosensitive transistor 26 is mounted above the hemispherical dome with the emitter 36 and base 34 facing the dome. A light transmitting medium 58 is used to fill the region between the reflector and the dome and for mounting the transistor above the dome, wherein the light transmitting medium acts as a cement to hold the components together. Ample space is provided between the top of the reflector plate 54 and the transistor for passing the lead 40 from the emitter region 36 out of teh region of the dome without being shorted to either the transistor or the reflector plate. The lead is held in place by the cement-like transmitting medium. When a forward bias current is passed through the junction of the radiant diode between the anode 48 and the cathode 50, light is emitted at the junction, travels through the dome 42 and the light transmitting medium 58 and strikes the surface of the transistor, where it is principally absorbed in the region of the collector-base junction to cause the transistor to conduct.

The hemispherical dome structure is preferably used in order to realize the highest possible quantum efficiency. If the proper ratio of the radius of the junction 46 to the radius of the hemispherical dome is selected, then all of the internally generated light that reaches the surface of the dome has an angle of incidence less than the critical angle and can be transmitted. The maximum radius of the diode junction with respect to the dome radius depends on the refractive index of the coupling medium, and since all of the light strikes the dome surface close to the normal, a quarter wavelength anti-reflection coating will almost completely eliminate reflection at the dome surface. The maximum radius of the light emitting diode junction to the dome radius is determined by computing the ratio of the index of refraction of the coupling medium to the index of refraction of the dome material. The dome, as shown in FIGURE 3, has a quarter wavelength anti-reflection coating 60 thereon comprised of zinc-sulfide to eliminate any possible reflection. A true hemispherical dome is optimum, because it gives the least bulk absorption to all spherical segments which radiate into a solid angle of $2\pi$ steradians or less. Spherical segments with height greater than their radius radiate into a solid angle less than $2\pi$ steradians, but have higher bulk absorption. Spherical segments with height less than either radius have less absorption but emit into a solid angle greater than $2\pi$ steradians and, therefore, direct a portion of the radiation away from the detector. Due to the presence of bulk absorption, the dome radius should be as small as possible to further increase the quantum efficiency of the unit.

The photosensitive transistor has a radius of about 1.5 times the radius of the hemispherical dome, which allows all the light emitted by the dome to be directed toward the detector by the use of a simple spherical reflecting surface 56. Since most of the light from the hemispherical dome strikes the transistor surface at high angles of incidence, an anti-reflection coating on the detector is not essential and can be considered optional. The light transmitting medium 58 between the dome and the transistor should have an index of refraction high enough with respect to the indices of refraction of the dome and the transistor to reduce internal reflections, and to allow the ratio of the junction radius of the diode to the dome radius to be increased. The medium should also "wet" the surfaces of the source and the detector so that there are no voids which would destroy the effectiveness of the coupling medium. The indices of refraction of the diode and the silicon transistor are each about 3.6. A resin such as Sylgard, which is a trade name of the Dow Corning Corporation of Midland, Michigan, has an index of refraction of about 1.43 and is suitable for use as the light transmitting medium. Although this index is considerably lower than 3.6, it is difficult to find a "transparent" substance that serves this purpose with a higher index. In order to insure the highest reflectivity, the reflector surface 56 is provided with a gold mirror 62 which can be deposited by plating, evaporation, or any other suitable process.

The metallic plates 52 and 54 are preferably comprised of a metal or alloy having the same or similar coefficient of thermal expansion as the junction diode, such as Kovar, for example. Similarly, the coupling medium 58 preferably has the same or similar coefficient of thermal expansion, or alternately remains pliable over a wide useful temperature range of normal operation. Again, Sylgard satisfies this requirement by being pliable.

Figure 2:
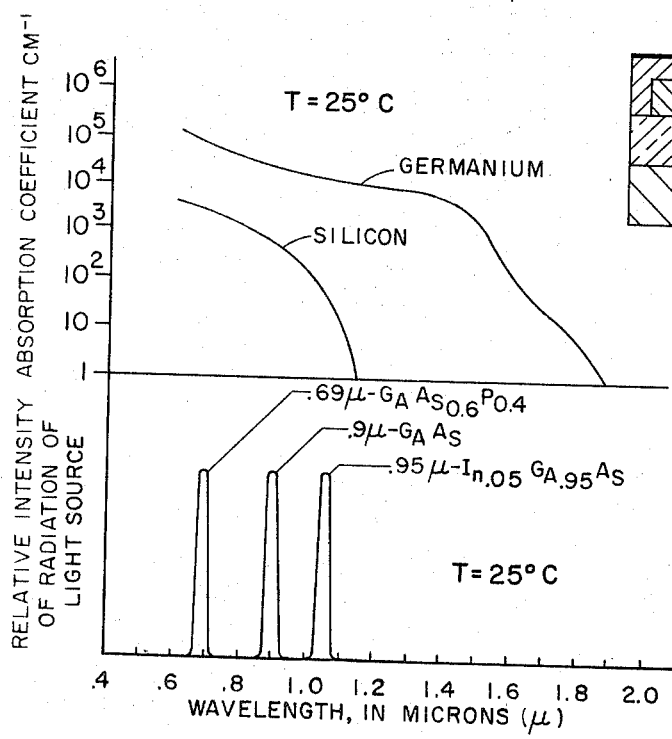

Various compositions of the light emitting diode and photosensitive transistor have been mentioned in conjunction with the graphs of FIGURE 2, wherein the preferred compositions depend upon several factors including the absorption coefficient of the photosensitive transistor, the ultimate efficiency to be achieved from the light emitting diode, and other factors as will be presently described. One factor to be considered is the speed of response of the photosensitive transistor to the optical radiation, wherein it has been seen that light of shorter wavelength gives a faster switching time because of the greater coefficient of absorption of the detector. This factor, if considered by itself, would indicate that a diode comprised of a material which generates the shortest possible wavelength is preferred. However, the efficiency of the light source must also be considered, in which the overall efficiency can be defined as the ratio of the number of photons of light emerging from the dome to the number of electrons of current to the input of the diode, and the internal efficiency is the ratio of the number of photons of light generated in the diode to the number of input electrons.

It was pointed out in the above co-pending application that, in most cases, less of the light generated internally in the diode is absorbed per unit distance in the n-type region than in the p-type region. Moreover, n-type material can normally be made of higher conductivity than p-type material of the same impurity concentration. Thus, the dome is preferably of n-type conductivity material. In addition to this factor, it has been found that the greater the band gap of the material in which the light is generated, the shorter the wavelength of the light, wherein the frequency of the generated light is about equal to or slightly less than the frequency separation of the band gap. It has further been found that the light is absorbed to some extent in the material in which it is generated or in a material of equal or less band gap width, but is readily transmitted through a material having a band gap width at least slightly greater than the material in which the light is generated. In fact, a sharp distinction is observed between the efficient transmission of light through a composition whose band gap is slightly greater than the composition in which the light is generated, and through a composition having a band gap equal to or less than that of the generating composition. This implies that the light is readily transmitted through a material the frequency separation of the band gap of which is greater than the frequency of the generated light.

To take advantage of this knowledge, the light emitting diode, in the preferred embodiment, is comprised of two differnt compositions in which the junction at or near which the light is generated is located in a first region of the diode comprised of a material having a first band gap width and of p-type conductivity, and in which at least the major portion of the dome is comprised of a second material having a second band gap width greater than the first material and is of n-type conductivity. Thus, light generated in the first material has a wavelength which is long enough to be efficiently transmitted through the dome. There are several materials that have been found to be internally efficient light generators when a forward current is passed throug ha junction located therein, in addition to GaAs noted in the above co-pending application. The material indium-arsenide, InAs, has a band gap width of about .33 e.v. and, if a p-n junction is formed therein, will generate light having a wavelength of about 3.8 microns, whereas light from GaAs is about .9 micron. The compositions $In_xGa_{1-x}As$, where $x$ can go from 0 to 1, give off light of wavelength which varies approximately linearly with $x$ between 3.8 microns for InAs when $x=1$ to .9 micron for GaAs when $x=0$. On the other side of GaAs is the composition gallium-phosphide, GaP, which has a band gap of about 2.25 e.v. and emits radiation of about .5 micron. Also, the compositions $GaAs_xP_{1-x}$, where $x$ can go from 0 to 1, give off light of wavelength which varies approximately linearly with $x$ between .9 micron for GaAs when $x=1$ to .5 micron for GaP when $x=0$. It has been found, however, that for various reasons, the internal efficiency of light generation begins to drop off when the band gap of the material is as high as about 1.8 e.v., which approximately corresponds to the composition $GaAs_{0.6}P_{0.4}$, or for $x$ equal to or less than about 0.6 for the compositions $GaAs_xP_{1-x}$.

Referring again to the FIGURE 3 and more specifically to the construction of the light emitting diode, a preferred embodiment comprises a dome 42 of n-type conductivity material with a smaller region 44 contiguous therewith in which a portion is of p-type conductivity. The region 44 is comprised of a composition having a first band gap width, and the dome 42 is comprised of a region having a second band gap width greater than that of region 44. The rectifying junction 46 is formed in the region 44 of smaller band gap width so that the light generated herein will be efficiently transmitted through the dome. The portion of region 44 between the junction 46 and the dome is of n-type conductivity. Referring to the graphs of FIGURE 2 and the foregoing discussion, a preferred composition for the region 44 is one which will generate as short a wavelength as posible in order to have a high coefficient of absorption in the transistor for fast switching action, and yet which will be efficiently transmitted by the dome 42. At the same time, the composition of region 44 should have a high internal efficiency as a light generator. The composition $GaA_{0.6}P_{0.4}$ will efficiently produce light of wavelength of about .69 micron and constitutes a preferred material for the smaller region 44. By making the dome of a composition of band gap slightly greater than that of the region 44, such as $GaAs_{0.5}P_{0.5}$, for example, or for $x$ equal to or less than 0.5 for the compositions $GaAs_xP_{1-x}$, the light will be efficiently transmitted. It should be noted that although the dome is comprised of a composition that does not have a high internal efficiency of light generation, this is unimportant, since the light is actually generated in the smaller region 44 of high efficiency. Thus, the dome material can be extended to compositions of relatively high band gap widths, even to GaP, without decreasing the over-all efficiency of the unit.

Other compositions and combinations thereof can be used, such as various combinations of $In_xGa_{1-x}As$ or $GaAs_xP_{1-x}$, or both. In addition, most III–V compounds can be used, or any other material which generates light by a direct recombination process when a forward current is passed through a rectifying junction therein. Moreover, the entire light emitting diode can be comprised of a single composition such as, for example, GaAs as described in the above copending application. It can, therefore, be seen how the compositions of the various components of the system can be varied to achieve various objectives, including the highest over-all efficiency of the entire system. Undoubtedly, other suitable compositions and combinations thereof will occur to those skilled in the art.

The light emitting diode can be made by any suitable process. For example, if two different compositions are used, a body or wafer constituted of a single crystal of one of the compositions can be used as a substrate onto which a single crystal layer of the other composition is deposited by an epitaxial method, which method is well known. Simultaneous with or subsequent to the epitaxial deposition, the rectifying junction can be formed in the proper composition, slightly removed from the boundary between the two, by the diffusion of an impurity that determines the opposite conductivity type of the composition. By etching away most of the composition containing the junction, the small region 44 can be formed. If the entire light emitting diode is comprised of a single composition, a simple diffusion process can be used to form the junction. The shape of the dome is formed by any suitable method, such as, for example, by grinding or polishing the region 42.

Although the preferred embodiment of the light emitting diode contains the junction in the region 44 below the boundary between the two regions 42 and 44, the junction can also be formed at this boundary or actually within the dome region 42 should this be more expedient for one or more reasons. In the case where the entire diode is comprised of a single composition, for example, an equally efficient light emitter can be made by locating the junction other than as shown in the preferred embodiment.

The photosensitive diodes 6, 8, 10 and 12 are also optically coupled to light emitting diodes 14, 16, 18 and 20 as just described to provide the electrode-optical coupling devices 5, 7, 9 and 11, respectively. As shown in FIGURE 4 with reference to diode 6, for example, each of the diodes are comprised of a semiconductor wafer 70 of a first conductivity type into which is diffused an impurity that determines the opposite conductivity type to form region 72. Region 72 can constitute either the anode or cathode of the diode, depending upon the conductivity type of the original wafer. Electrical connections 74 and 76 are made to the wafer 70 and region 72, respectively, to provide terminals for the diode. The depth of the junction between regions 70 and 72 is determined on the same basis as the junction depths of the transistor 22. Although not shown, the diode is optically coupled to a light emitting diode by means of the light transmitting medium 54 exactly as shown in FIGURE 3.

Figure 5:
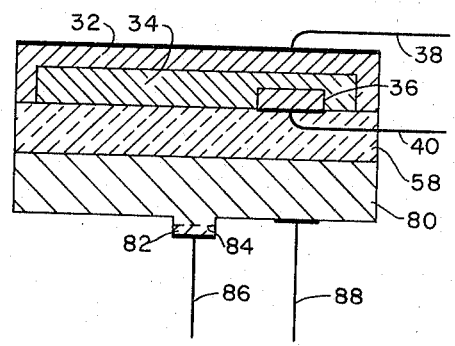
FIGURE 5 is an elevational view in section of another embodiment of an electro-optical coupling device which shows a planar constructed light emitting diode.

Another embodiment of the coupling device is shown in FIGURE 5, which is an elevational view in section of a planar constructed light emitting diode optically coupled to a planar transistor as shown in FIGURE 3. The light emitting diode comprises a wafer 80 of semiconductor material of a first conductivity type into which is diffused an impurity that determines the opposite conductivity type to form a region 82 of said opposite conductivity type separated from the wafer 80 by a rectifying junction 84. The wafer is etched to cut below the junction and form the small region 82. Alternatively, the region 82 can be formed by an epitaxial process. Electrical leads 86 and 88 are connected to the region 82 and wafer 80 as previously described.

The wafer 80 is not formed into a dome structure in this embodiment, but is left in a planar configuration and optically coupled to the detector, as shown, with a suitable coupling medium 58 as noted earlier. This embodiment is more expedient to fabricate, as can be readily seen, and thus is advantageous in this respect. As indicated above, the dome structure is used to realize a high quantum efficiency, since all of the internally generated light strikes the surface of the dome at less than the critical angle, and thus little, if any, light is lost to internal reflections within the dome. This is not necessarily the case in the planar embodiment of FIGURE 5, and in order to achieve a high quantum efficiency, the diameter of the apparent light emitting surface of wafer 80, assuming a circular geometry, can be made somewhat smaller than the combined diameters or lateral dimensions across the two emitters of the detector. The apparent light emitting surface of the diode is determined by the thickness of wafer 80, the area of the light emitter junction 84, and the critical angle for total internal reflection. The critical angle of reflection is determined by computing the arcsine of the ratio of the index of refraction of the coupling medium 58 to the index of refraction of the semiconductor wafer 80.

In the preceding discussions, it was noted that a coupling medium having a suitable index of refraction is preferably used between the light emitting diode and the detector. If such a medium is used, it should have a high index to match, as closely as possible, that of the two components between which it is situated. Materials other than Sylgard can also be used, such as a high index of refraction glass. However, it can prove expedient and desirable in certain cases to couple the two components together with air, where a physical coupling is either impractical or impossible, and such a system is deemed to be within the intention of the present invention.

Other modifications, substitutions and alternatives will undoubtedly occur that are deemed to fall within the scope of the present invention, which is intended to be limited only as defined in the appended claims.

What is claimed is:

1. An electro-optical amplifier circuit arrangement, comprising:
    (a) an active device for amplifying an electrical input signal and producing an electrical output in response thereto,
    (b) electrical input terminals coupled to the input of said active device,
    (c) first photosensitive means electrically coupled to and supplying electrical power to said active device in response to optical radiation incident thereon,
    (d) first light emitting means electrically isolated from but optically coupled to said first photosensitive means for generating said optical radiation,
    (e) second light emitting means electrically coupled to the output of said active device for generating optical radiation in response to said electrical output from said active device,
    (f) second photosensitive means electrically isolated from but optically coupled to said second light emitting means for generating an electrical signal in response to said optical radiation from said second light emitting means, and
    (g) electrical output terminals coupled to said second photosensitive means.

2. An electro-optical amplifier circuit arrangement according to claim 1 wherein said active device comprises a transistor.

3. An electro-optical amplifier circuit arrangement according to claim 1 wherein said first photosensitive means comprises at least one semiconductor device having a rectifying junction therein.

4. An electro-optical amplifier circuit arrangement according to claim 1 wherein said active device comprises transistor means, said first photosensitive means comprises at least one semiconductor junction diode for producing photocurrent in response to said optical radiation, said second photosensitive means comprises a semiconductor device having at least one rectifying junction therein and being responsive to said optical radiation for altering the characteristics of said at least one rectifying junction, and said first and said second light emitting means each comprises at least one semiconductor junction diode which generates optical radiation when a forward current is passed through the junction thereof.

5. An electro-optical amplifier circuit arrangement, comprising:
    (a) a transistor having emitter, base and collector regions,
    (b) electrical input terminals coupled to two of said regions,
    (c) a plurality of semiconductor diodes connected in electrical series with like polarities and coupled across one of said two regions and the other of said regions and generating photocurrent in response to optical radiation incident on said plurality of diodes.
    (d) first light emitting means comprising at least one semiconductor junction device electrically isolated from but optically coupled to said plurality of diodes which generates said optical radiation when a forward current is passed through the junction thereof.
    (e) second light emitting means coupled across said plurality of diodes and comprising at least one other semiconductor junction device which generates optical radiation when a forward current is passed through the junction thereof,
    (f) photosensitive means electrically isolated from but optically coupled to said second light emitting means and comprising another semiconductor device having at least one rectifying junction the characteristics of which are altered in response to said optical radiation from said second light emitting means, and
    (g) electrical output terminals coupled to said photosensitive means.

6. An electro-optical amplifier circuit arrangement, according to claim 5 including another semiconductor diode coupled between said one of said two regions of said transistor and one of said input terminals, said series connection of said plurality of diodes being connected to the interconnection of said another diode and said one of said input terminals, and a third light emitting means comprising a semiconductor junction device electrically isolated from but optically coupled to said another diode and generating optical radiation when a forward current is passed through the junction thereof, said another diode generating photocurrent in response to said optical radiation.

7. An electro-optical amplifier circuit arrangement according to claim 5 including means coupled to said first light emitting means for supplying said forward current.

8. An electro-optical amplifier circuit arrangement according to claim 5 wherein said plurality of diodes produces said forward current through said second light emitting means.

9. An electro-optical amplifier circuit arrangement according to claim 5 wherein said two of said regions are the base and emitter regions, respectively, of said transistor.

No references cited.

ROY LAKE, *Primary Examiner.*

N. KAUFMAN, *Assistant Examiner.*